United States Patent Office 3,449,626
Patented June 10, 1969

3,449,626
CONTROL MECHANISMS FOR FLASHING LIGHTS, ESPECIALLY FOR DIRECTION INDICATOR LIGHTS FOR MOTOR VEHICLES
Gaëtan de Coye de Castelet, Billancourt, France, assignor to Regie Nationale des Usines Renault, Billancourt, Hauts-de-Seine, France
Filed Oct. 24, 1965, Ser. No. 504,374
Claims priority, application France, Feb. 16, 1965, 5,732
Int. Cl. B60q 1/38
U.S. Cl. 315—77                                    1 Claim

ABSTRACT OF THE DISCLOSURE

A control mechanism for the lights of a vehicle comprising a flasher unit including means to shunt resistors in the lighting circuitry thus providing high and low light intensities for daylight and night driving respectively.

---

President traffic conditions demand, for safety, that vehicles be provided with direction lights and stop lights which are sufficiently bright for them to be clearly seen by day, even in the strongest sunlight. On the contrary however this intensity becomes very troublesome when the surrounding light grows dull, for instance at night. It is therefore preferable to provide two light intensities; one, the stronger, for day traffic, the other, less bright, for night traffic.

While the double intensity for the stop lights could easily be obtained merely by introducing a simple resistance into the circuit, the problem is more complex for direction indicator lights. Controls for flashing lights, otherwise designated flasher units, have been designed and constructed for use according to the operative standards which determine the best frequencies and the light on/off ratio and require a device termed "the effective control device" for warning the driver of the vehicle in case of defect in one of the main lights, front or rear, on a given side. These conditions of frequency and control usually depend on the strength of the current passing through the flasher unit. To obtain, with given operating conditions of the lights a double light intensity, it is therefore necessary, either to make the current strength passing through the flasher unit constant and independent of the direction lights, or to provide a device making it possible to preserve these working conditions whatever the current strength used may be. The solutions usually adopted until now render the current strength passing through the flasher unit independent of the light intensity, by a complex and cumbersome system of resistances, in series and in parallel. The present invention relates to a more simple designed control device such that the working arrangement of the flasher unit is independent of the current strength passing through it, and variable with the brightness of the lights.

Essentially, the control mechanism for flashing lights according to the invention, comprising a flasher unit with a heating wire or bi-metallic strip and means for controlling the change from day-time operation condition to night-time operation condition where the brightness of the lights is reduced, in characterized in that these are provided two supply circuits for the lights, passing through the flasher unit, one of which comprises, in parallel with the heating wire, a resistor (or a semiconductor or a variable resistor) which is or is not connected in the circuit by the said control means and chosen so as to obtain the desired variable intensity at the same time as the passage of a modified current in the heating wire to conserve at the flasher unit an operational frequency substantially identical in the two cases.

Figure 1:
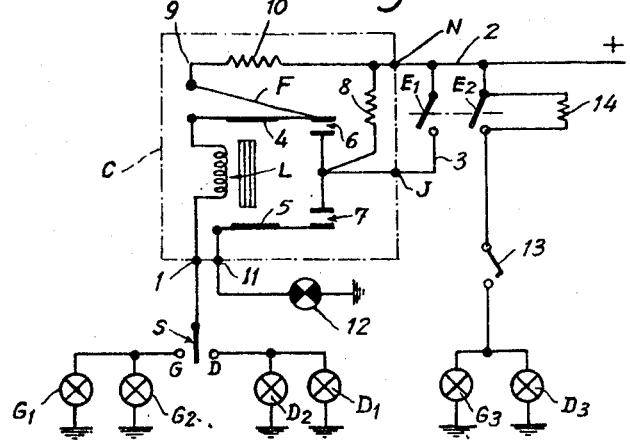
Figure 2:
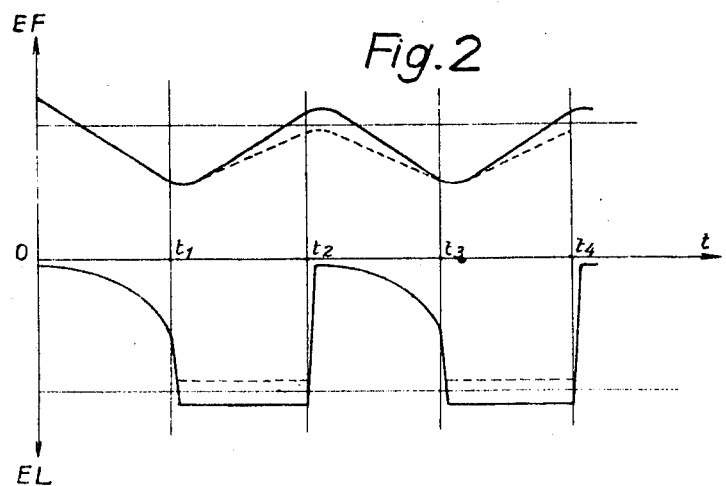

An embodiment of a control mechanism according to the invention will now be described, by way of example with reference to the accompanying drawing in which:

FIGURE 1 is a diagrammatic view of a vehicle's flashing lights and stop lights control system, with the flasher unit of the heating wire type, and FIGURE 2 is a graph showing the day and night operation of the arrangement in FIGURE 1.

The arrangement represented in FIGURE 1 comprises left side and rear direction indicator lights $G_1$ and $G_2$, and similar lights $D_1$ and $D_2$ on the right side of a vehicle. These lights $G_1$ and $G_2$ on the one hand, and $D_1$ and $D_2$ on the other are respectively fitted in parallel between the vehicle chassises (the negative terminal of the battery being ground) and the terminals G and D of a direction indicator change-over switch S. This latter is connected to the terminal 1 of a flasher unit diagrammatically represented by the rectangle C. A terminal N of the unit is connected by a wire 2 to the positive battery terminal in the conventional manner, via the lighting contact (not shown) of the vehicle in question.

The flasher unit C comprises another positive terminal J connected to the wire 2 by a conductor 3 which includes a contact $E_1$ under the control of the lighting change-over switch of the vehicle (not shown).

The flasher unit C comprises an electromagnet L having two armatures 4 and 5 which control the movable element contacts 6 and 7 respectively.

The fixed elements of the contacts 6 and 7 are joined together and have one conection heading via a resistance 8 to a terminal N, and a second connection with the terminal J.

The coil of the electromagnet L is connected between the terminals 1 and the armature 4, this latter being connected, by a heating wire F, to the conductor 9 which leads via a resistance 10 to the terminal N.

The armature 5 is connected to a further terminal 11 of the flasher unit, to which is connected a warning indicator light 12.

Backing lights $G_3$ and $D_3$ usually known as "stop lights" are also fitted in parallel to the direction lights control system. These lights are connected to the wire 2 via switch 13 controlled by the brake system of the vehicle and a contact $E_2$ forming part of the general lighting switch of the vehicle, while a resistance 14 is shunted to the said contact $E_2$.

This arrangement works as follows:

By day, the general lighting switch is in its off position (head and tail lights unlit) so that the contacts $E_1$ and $E_2$ are closed and the resistor 8 of the flasher unit and the resistor 14 of the stop lights are short circuited. This position permits the supply of current to the indicator lights in question at the rated voltage of the sources of current.

Assuming that the change-over switch S of the direction indicator lights is brought into the position D the current reaches the flasher unit by way of the terminals N and J, but the contacts 6 and 7 being initially open the circuit is completed by the terminal N across the resistance 10, the heating wire F, the electromagnet L, the terminal 1, the change-over switch S and lamps $D_1$, and $D_2$ which do not light up. The current therefore heats the wire F which expands and releases the armature 4 so that the contact 6 closes, short-circuiting the resistance 10 and the wire F and causing the lamps $D_1$, $D_2$ to light up. The current passing through the winding of the electromagnet L is then at a maximum and is sufficient to attract the armature 5 closing the contact 7, so that the warning indicator lamp 12 lights up. But as the resistor 10 and the wire F are short-circuited, wire F cools and contracts until it attracts the armature 4 and thus opens the contact 6 when the force of contraction of the wire becomes greater than the holding force of the magnet L, so that the lamps $D_1$, $D_2$ are simultaneously extinguished. The current in the magnet L becoming a minimum, the contact 7 opens and the warning lamp 12 goes out. This cycle is ready to recommence as long as the selector S is maintained in position D.

It should be noted that the frequency of repetition of the cycle depends on the time and point of heating and contraction of the wire F; on the lift of the electromagnet L, and hence of the current passing through it.

The graph in FIGURE 2 illustrates, with the time as abscissa, the variation in the force EF of the wire F (represented above the O$t$ axis) and of the force EL of the electromagnet L on the armature 4 (represented below the O$t$ axis). This graph clearly shows the points of flection $t_1$, $t_2$, $t_3$, and $t_4$ of the flasher unit as a function of the reciprocal balance of forces of the heating wire F and the electromagnet L (O$t_1$ being the extinction time, $t_1$, $t_2$ the lighting time, etc.). This flexion occurs fairly abruptly because as the armature 4 approaches or withdraws from the core of the elecromagnet, the force to which it is subjected increases or decreases according to the square of their distance.

By regulating a return spring (not shown) of the armature 5, the warning lamp 12 can be energized for a given value of the current in the coil of the electromagnet L.

By night, the general lighting switch being put into the fixed lights lighting position, for example, head and rear lamps are lit and the contacts $E_1$ and $E_2$ opened. It will be noted already that the resistance 14 is in series with the braking lights $D_3$, $G_3$ which would therefore in such a case only be suppplied with current at reduced voltage.

As before, it is assumed that the changeover switch S of the direction indicator lights is put into position D to actuate the flashing lights on the right hand side. The current reaches the flasher unit via the terminal N, but as the contacts 6 and 7 are open the circuit is completed via the resistor 10, the heating wire F, the electromagnet L, the terminal 1, the change-over switch S and the lamps $D_1$, $D_2$. The current therefore heats the wire F which expands and releases the armature 4 so that the contact 6 closes permitting current to flow to the lamps, via the resistor 8, at a voltage causing them to light up, although reduced in comparison with the preceding example by the insertion into the circuit of this resistance to the lighting of the lamp, the brightness of which is accordingly reduced.

While the lamps are lit it is to be noted that the resistor 10 and the wire F continue to be supplied with current in parallel to the resistor 8. Thus, although the current in the electromagnet is reduced and hence the holding force of this latter is less, the amount of time for which the lamps are working will be substantially the same as in daytime operation, for as the residual current through the resistor 10 and the wire F retards the contraction of this latter, the point of equilibrium of the forces, in time, is maintained, as the graph of FIGURE 2 shows clearly by the change in the curve of the forces EF and EL, shown in dotted line. A careful adjustment of the ratio of the resistors 10 and 8 thus makes it possible to maintain the frequency and light-on/off ratio, substantially constant.

It will be noted that, although the change from day operation to night operation has been indicated here as dependent on the operation of the general light switch of the vehicle, this change can also be provided in particular by means of a thermal magnetic relay coupled with the vehicle lighting circuit, or automatically by means of a photo-electric cell sensing the intensity of the ambient light conditions.

Moreover, this embodiment calls for a type of flasher unit which must not be supposed to be exclusive within the scope of the invention, but there is here merely illustrative of this latter as, of course, the present invention if applicable, in its general outlines as already defined, with any other types of flasher unit with heating wire or bimetallic strip known to the person skilled in the art.

I claim:
1. A turn signal light means for motor vehicles and means for flashing said light means at a constant rate for at least two intensity levels comprising: a flasher unit, means connecting an output terminal of said unit to said light means, resistance means connected between a source of potential and an input terminal of said unit, a conductive shunt and contact means for normally connecting said shunt across said resistance means, said contact means controlled by the vehicle headlight switch to be opened when the headlights are on, said flasher unit including electromagnet means having a fixed contact serving as said input terminal and two movable contact means operatively adjacent to said fixed contact, the first movable contact means connected between said source of potential in series with a thermally expandable wire means for opening said first contact in response to current selectively passing therethrough, said first movable contact means when closed allowing current to flow from said input terminal through said electromagnetic means to said output terminal, said electromagnetic means upon current flow therethrough serving to close said second contact means, and an indicator light energized upon closure of said second contact means.

References Cited

UNITED STATES PATENTS

| | | | |
|---|---|---|---|
| 2,339,687 | 1/1944 | Doane | 340—74 |
| 2,648,059 | 8/1953 | Hostetler | 315—83 |
| 2,822,505 | 2/1958 | Wilfert | 315—83 |
| 3,148,306 | 9/1964 | Onsken et al. | 315—82 |
| 3,246,181 | 4/1966 | Bleiweiss et al. | 340—81 |
| 3,267,426 | 8/1966 | Parkes | 315—83 |
| 3,284,770 | 11/1966 | Bleiweiss et al. | 340—81 |

FOREIGN PATENTS 1,046,169   12/1953   France.

JOHN W. HUCKERT, *Primary Examiner.*

J. SHEWMAKER, *Assistant Examiner.*

U.S. Cl. X.R.

315—49, 309, 313